United States Patent
Takekoshi

(12) 
(10) Patent No.: US 6,369,170 B1
(45) Date of Patent: Apr. 9, 2002

(54) METHOD FOR PREPARING POLYETHER COPOLYMERS WITH POLYCARBONATES AND POLYARYLATES

(75) Inventor: Tohru Takekoshi, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/458,920

(22) Filed: Dec. 10, 1999

(51) Int. Cl.[7] .................................................. C08F 67/00
(52) U.S. Cl. ........................ 525/437; 525/425; 525/436; 525/461; 525/462; 525/467
(58) Field of Search ................................ 525/437, 436, 525/425, 467, 461, 462

(56) References Cited

U.S. PATENT DOCUMENTS

| | | | |
|---|---|---|---|
| 5,159,028 A | 10/1992 | Matzner | |
| 5,229,482 A | 7/1993 | Brunelle | ........................ 528/125 |

FOREIGN PATENT DOCUMENTS

| | | | |
|---|---|---|---|
| WO | 0 859 022 | 8/1998 | |
| WO | 0 866 085 | 9/1998 | |
| WO | 0 908 485 | 7/1999 | |

OTHER PUBLICATIONS

European Search Report.

J.E. McGrath, et al., "Homogeneous and Microhomogeneous Block Copolymers", Journal of Polymer Science: Polymer Symposium 60, pp. 29–46 (1977).

*Primary Examiner*—Ana Woodward
(74) *Attorney, Agent, or Firm*—S. Bruce Brown; Noreen C. Johnson

(57) ABSTRACT

Copolymers of polycarbonates or polyarylates with polyether polymers such as polyethersulfones, polyetherketones, and polyetherimides are prepared by reaction of the polyether polymer-forming reagents, e.g., bisphenol A disodium salt and bis(4-chlorophenyl)sulfone, in the presence of the polycarbonate or polyarylate. The reaction may take place in a dipolar aprotic solvent, or in a water-immiscible aromatic solvent in the presence of a phase transfer catalyst, preferably a hexaalkylguanidinium halide. Hydroxy-terminated polyether oligomers may be produced from the copolymers by saponification of carbonate or ester groups.

17 Claims, No Drawings

METHOD FOR PREPARING POLYETHER COPOLYMERS WITH POLYCARBONATES AND POLYARYLATES

BACKGROUND OF THE INVENTION

This invention relates to condensation copolymer preparation, and more particularly to the preparation of copolymers of polyether polymers and oxycarbonyl group-containing polymers.

Polycarbonates, polyarylates, polyethersulfones, polyetherketones, and polyetherimides (the latter three frequently being collectively designated "polyether polymers" herein) are known high performance polymers characterized by various desirable properties. It is frequently of interest to combine these properties. Combined properties can often be attained by forming blends of two polymers. However, polycarbonates and polyarylates are typically incompatible with most polyether polymers, forming poorly dispersed blends which may be opaque and unsatisfactory for such applications as glazing and fabrication of optical disks.

Therefore, the preparation of copolymers containing both ether-derived and carbonate or ester structural units is of interest. Methods for preparation of such copolymers are hard to develop, since the preparation methods characteristic of each type of polymer are widely different. Polycarbonates are conventionally produced from bisphenols either by reaction with phosgene in a two-phase organic-aqueous system under basic conditions or by reaction with diphenyl carbonate in the melt, and polyarylates are produced under similar conditions. Polyether polymers, on the other hand, are frequently produced by reaction between a salt of a dihydroxyaromatic compound and a dihaloaromatic compound under anhydrous conditions in a dipolar aprotic solvent or a water-immiscible aromatic solvent of low polarity. None of these methods of preparation can be used for both polycarbonates or polyarylates and polyether polymers.

A method of copolymer preparation has been described by McGrath et al. (Polymer Engineering Science, vol. 17, pp. 647–651, 1977) in which hydroxy-terminated polyethersulfone oligomers are first synthesized in a dipolar aprotic solvent. Said oligomers are then isolated and employed in an interfacial reaction with a monomer such as bisphenol A, in a halogenated solvent such as methylene chloride. This synthesis requires two successive, different polymerization reactions under widely different conditions and is thus cumbersome.

It would be more practical to conduct both steps, i.e., the preparation of the polyether oligomers and their reaction to form polycarbonate or polyarylate copolymers, in a single solvent. In addition, low to medium molecular weight hydroxy-terminated polyether oligomers are useful to make short-block, random, block copolymers, which do not exhibit complex multi-phase morphology often observed for long-sequence block copolymers.

Copolymer and oligomer preparation has not been readily achievable, however, by reason of differences in solubility between an alkali metal salt of the dihydroxyaromatic compound and the dihaloaromatic compound, as illustrated by bis(4-chlorophenyl)sulfone. In a homogeneous solution polymerization, such as the procedure in dipolar aprotic solvents, hydroxy-terminated polyether oligomers with statistically distributed molecular weight can be readily prepared simply by use of an excess of the dihydroxyaromatic compound. However, it is not possible to make such oligomers of low to moderate molecular weights in non-polar solvents, even when phase transfer catalysts are employed.

This is true because the alkali metal (e.g., sodium) salt of the dihydroxyaromatic compound is typically insoluble in relatively non-polar solvents such as anisole and dichlorobenzene. In the presence of phase transfer catalyst, a minute amount of the salt may be solubilized at any moment. As the solubilized salt reacts with the dihaloaromatic compound in solution, more salt dissolves to maintain its minute steady state concentration. At the end of the reaction, when all the dihaloaromatic compound is consumed, the excess salt is left undissolved without participating the polymerization reaction. Thus, despite use of excess dihydroxyaromatic compound the system behaves like an equimolar polymerization, resulting in high molecular weight polymer.

It is of interest, therefore, to develop a simple method for the synthesis of highly random polyether-polycarbonate and polyether-polyester copolymers. It is also of interest to develop a method for preparing and isolating low to medium molecular weight hydroxy-terminated oligomers of the polyether polymers, rather than producing only high molecular weight polymers.

SUMMARY OF THE INVENTION

The present invention is based in part on the discovery that when polyether polymers are prepared in relatively non-polar solvents in the presence of polycarbonate or a polyarylate, extensive exchange takes place with incorporation of carbonate or arylate units in the product polymer in relatively random fashion.

The invention in one of its aspects, therefore, is a method for preparing a copolymer of a first polymer which is a polyethersulfone, polyetherketone, or polyetherimide and a second condensation polymer characterized by structural units containing an oxycarbonyl group, which comprises contacting, under reactive conditions, at least one salt of a dihydroxyaromatic compound with at least one substituted aromatic compound of the formula $$Z(A^1-X^1)_2, \qquad (I)$$

wherein Z is an activating radical, $A^1$ is an aromatic radical and $X^1$ is fluoro, chloro, bromo or nitro, in the presence of said second polymer.

It has further been discovered that the product copolymers can be degraded by saponification into hydroxy-terminated oligomers of the polyether polymers. Said oligomers are capable of conversion into special purpose copolymers, such as optical grade copolyethercarbonates, by means of an interfacial polymerization in the same vessel or by addition to a melt polycarbonate preparation mixture.

Another aspect of the invention, therefore, is a method for preparing at least one hydroxy-terminated oligomer of a polyether polymer which comprises preparing a copolymer as described above and contacting said copolymer with alkali metal hydroxide under reactive conditions, thus hydrolyzing carbonate and ester units.

DETAILED DESCRIPTION; PREFERRED EMBODIMENTS

The alkali metal salts of dihydroxy-substituted aromatic hydrocarbons (hereinafter sometimes designated simply "salt" for brevity) which are employed in the present invention are typically sodium and potassium salts. Sodium salts are frequently preferred by reason of their availability and relatively low cost. Said salt may be employed in anhydrous form. However, in certain instances the employment of a hydrate, such as the hexahydrate of the bisphenol A disodium salt, may be advantageous provided water of hydration is removed before the substituted aromatic compound is introduced.

Suitable dihydroxy-substituted aromatic hydrocarbons include those having the formula

(II)

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula

(III)

wherein each of $A^3$ and $A^4$ is a monocyclic divalent aromatic hydrocarbon radical and Y is a single bond or a bridging radical in which one or two atoms separate $A^3$ from $A^4$. The free valence bonds in formula III are usually in the meta or para positions of $A^3$ and $A^4$ in relation to Y. Compounds in which $A^2$ has formula III are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or hydrocarbon-substituted derivatives thereof, illustrative substituents (one or more) being alkyl and alkenyl. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is a single bond or a radical in which one or two atoms, preferably one, separate $A^3$ from $A^4$. Illustrative radicals of this type include methylene, cyclohexylmethylene, 2-[2.2.1]-bicycloheptylmethylene, ethylene, isopropylidene, neopentylidene, cyclohexylidene, cyclopentadecylidene, cyclododecylidene, adamantylidene, O, S, S(O)$_2$, and C=O. Hydrocarbon and especially gem-alkylene (alkylidene) radicals are preferred. Also included, however, are unsaturated radicals. For reasons of availability and particular suitability for the purposes of this invention, the preferred radical of formula III is the 2,2-bis(4-phenylene)propane radical, which is derived from bisphenol A and in which Y is isopropylidene and $A^3$ and $A^4$ are each p-phenylene.

The substituted aromatic compounds of formula I which are employed in the present invention contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The Z radical is usually an electron-withdrawing group, which may be di- or polyvalent to correspond with the valence of $A^1$. Examples of divalent radicals are carbonyl, carbonylbis(arylene), sulfone, bis(arylene)sulfone, benzo-1,2-diazine and azoxy. Thus, the moiety —$A^1$—Z—$A^1$— may be a bis(arylene)sulfone, bis(arylene)ketone, tris(arylene)bis(sulfone), tris(arylene)bis(ketone), bis(arylene)benzo-1,2-diazine or bis(arylene)azoxy radical and especially one in which $A^1$ is p-phenylene.

Also included are compounds in which —$A^1$—Z—$A^1$— is a bisimide radical, illustrated by those of the formulas (IV and (V):

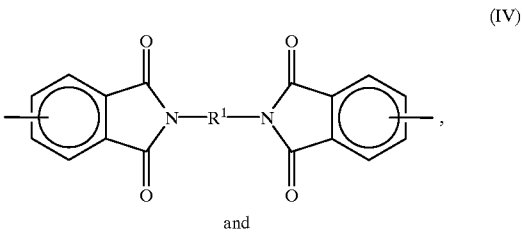

(IV)

and

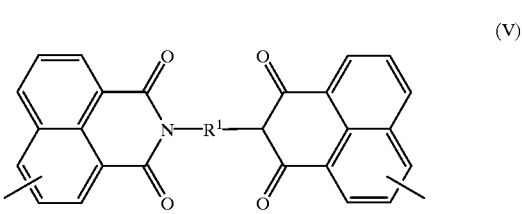

(V)

wherein $R^1$ is a $C_{6-30}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

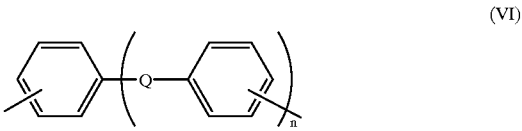

(VI)

in which Q is

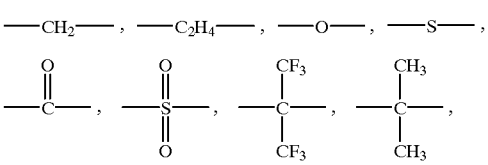

or a covalent bond, and n is an integer from 1 to 3 inclusive. Preferably n is 1. Most often, $R^1$ is at least one of m-phenylene, p-phenylene, 4,4'-oxybis(phenylene) and

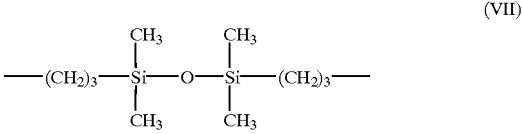

(VII)

Polyvalent Z radicals include those which, with $A^1$, form part of a fused ring system such as benzimidazole, benzoxazole, quinoxaline or benzofuran.

Also present in the substituted aromatic compound of formula I are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are bis(4-chlorophenyl)sulfone, bis(4-fluorophenyl)ketone and 1,3- and 1,4-bis[N-(4-chlorophthalimido)]benzene and 4,4'-bis[N-(4-chlorophthalimido)]phenyl ether and the corresponding bromo and nitro compounds. Bis(4-chlorophenyl)sulfone is often most preferred.

The second polymer is a condensation polymer characterized by the presence of an oxycarbonyl group, i.e., —C(O)O—, in its structural units. Suitable polymers are polycarbonates and polyarylates. Most often, the second polymer is derived from a dihydroxyaromatic compound having formula II. Among polycarbonates, the bisphenol A polycarbonates are preferred. Polyarylates include bisphenol A iso/terephthalates and those derived from dihydroxybenzenes, especially resorcinol and hydroquinone iso/terephthalates.

According to the invention, contact is made between the salt, the substituted aromatic compound and the second polymer under reactive conditions, usually parallel to the conditions normally employed for polyether polymer formation. These may include the presence of a solvent and temperatures in the range of about 100–300° C., preferably in the range of about 125–300° C., and more preferably in the range of about 150–250° C. Suitable solvents include the dipolar aprotic liquids such as dimethylformamide, dimethylacetamide, N-methylpyrrolidinone, dimethyl sulfoxide and sulfolane, and water-immiscible, relatively non-polar aromatic compounds such as chlorobenzene, o-dichlorobenzene and anisole and mixtures thereof.

When an aromatic solvent is employed, it is strongly preferred for a phase transfer catalyst to be present, especially a phase transfer catalyst with high thermal stability, i.e., one that is stable in the range of about 100–300° C. and preferably in the range of about 125–250° C. Various types of phase transfer catalysts have this property. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. Said patents are incorporated by reference herein. The preferred phase transfer catalysts, by reason of their exceptional stability at high temperatures and their effectiveness to produce high molecular weight copolymer in high yield, are the hexaalkylguanidinium and α,ω-bis(pentaalkylguanidinium)alkane salts.

Reagent proportions according to the invention conventionally include a 1:1 molar ratio of salt to substituted aromatic compound, although slight variations therefrom, up to about 2 mole percent, can be tolerated in certain instances. The proportion of second polymer will depend on the desired proportions of structural units in the product copolymer. In general, the second polymer will be present in the amount of about 1–80 mole percent and preferably about 2–50 mole percent of structural units therein based on substituted aromatic compound. Proportions of catalyst, when employed, are most often in the range of about 1–10 mole percent based on substituted aromatic compound.

Although the invention is not dependent upon mechanism, it is believed that the reaction between the salt and the substituted aromatic compound in the presence of the second polymer causes extensive reaction of said polymer with phenoxide-derived anions, resulting in breakup of the second polymer into oligomeric or even monomeric units having phenoxide-terminated anions as end-groups. These then react with the substituted aromatic compound, generally at a significantly slower rate. The product is a copolymer with a more random distribution of ether and carbonate or ester structural units than is afforded by prior art methods. It may be isolated from the reaction mixture by conventional operations such as anti-solvent precipitation.

Typical weight average molecular weights for the copolymer, as determined by gel permeation chromatography relative to polystyrene, are in the range of about 20,000–40,000. It is possible to saponify the carbonate or ester groups with aqueous alkali and recover hydroxy-terminated polyether oligomer therefrom; the degree of polymerization of said oligomer is typically in the range of about 5–15 as determined by hydroxy end-group analysis.

The copolymers of this invention combine the desirable properties of the first and second polymers as described herein. Thus, they are useful in applications requiring combinations of those properties. They can also be employed in minor proportions as compatibilizers for blends of said polymers, and additionally of blends of said first polymers with, for example, poly(alkylene carboxylates) such as poly(ethylene terephthalate) and poly(1,4-butylene terephthalate).

In the second aspect of the invention, the copolymer thus prepared, in solution in the solvent employed, is contacted with an excess, for example a molar ratio to carbonate and/or ester units within the range of about 2–20:1, of aqueous alkali, typically sodium hydroxide or potassium hydroxide of a concentration in the range of about 0.5–2.5 M, under reactive conditions which most often include temperatures in the range of about 80–150° C. The result is hydrolysis by saponification of the carbonate and/or ester groups in the copolymer. What remains is hydroxy-terminated, oligomeric polyether polymer, e.g., polyethersulfone. Such oligomeric material is not readily prepared in non-polar solvents by other methods, for reasons previously described. It is highly desirable, however, since it can be used as a reagent for preparation of special purpose copolymers of the types enumerated hereinabove.

The invention is illustrated by the following examples. All percentages are by weight. Glass transition temperatures (Tg) were determined by differential scanning calorimetry.

EXAMPLE 1

A 300 milliliter (ml), three-necked flask fitted with a stirrer, Dean-Stark trap attached to a condenser and nitrogen purge means was charged with 9.864 grams (g) (124.17 millimoles [mmol]) of 50.36% aqueous sodium hydroxide solution, 14.172 g (62.08 mmol) of bisphenol A, 40 ml of water and 75 ml of toluene. The mixture was heated under reflux and water removed by azeotropic distillation. The majority of the toluene and about 44 ml of water were distilled off. Then 75 ml of anisole was added and distillation was continued for one hour.

The Dean-Stark trap was replaced by a recirculating trap filled with calcium hydride as a drying agent and the mixture was heated under reflux for two hours, with recirculation of the anisole through the calcium hydride. The resulting slurry of bisphenol A disodium salt was cooled and 17.828 g (62.08 mmol) of bis(4-chlorophenyl)sulfone and 3.947 g (15.52 mmol of structural units) of a commercially available bisphenol A polycarbonate were added. The polycarbonate was dissolved by heating for 2.5 hours at 95–110° C., after which a solution of 864.2 milligrams (mg) (2.483 mmol) of hexa-n-propylguanidinium chloride in 10 ml of dry anisole was added. The temperature was raised to reflux temperature (152° C.) over two hours, and refluxing was continued for 2.5 hours.

The resulting viscous solution was divided into two approximately equal portions. The first portion was cooled to room temperature, diluted with methylene chloride and quenched by addition of acetic acid. It was then mixed with methanol in a blender and the white precipitate was washed with methanol and twice with hot water and dried in vacuum, yielding the desired copolyethersulfonecarbonate having a 4:1 ratio of ether sulfone to carbonate groups, a weight average molecular weight, as determined by gel permeation chromatography relative to polystyrene, of 31,700 and a single Tg of 177.8° C.

EXAMPLE 2

The second portion of polymer solution from the procedure of Example 1 was blended at 100° C. with 6 ml of aqueous potassium hydroxide solution prepared from 40 mmol of KOH and 25 ml of water, whereupon the viscosity rapidly decreased. After 45 minutes, the mixture was cooled and neutralized with acetic acid. The polyethersulfone oligomer was precipitated in methanol, washed with methanol and water and dried. Its degree of polymerization, as determined by hydroxy end-group analysis, was 8.64 and its Tg (single) was 117.9° C.

EXAMPLE 3

The procedure of Example 1 was repeated, employing 13.995 g (61.305 mmol) of bisphenol A in 75 ml of anisole, 17.604 g (61.305 mmol) of bis(4-chlorophenyl)sulfone, 1.732 g (6.182 mmol of structural units) of bisphenol A polycarbonate and 853 mg (2.45 mmol) of hexa-n-propylguanidinium chloride. The polymerization mixture was heated under reflux for 1.5 hours and divided into two approximately equal portions. The product copolymer obtained from the first portion had a weight average molecular weight of 28,740 and a single Tg of 179.7° C.

EXAMPLE 4

The second portion of the reaction mixture of Example 3 was contacted with aqueous potassium hydroxide mixture as described in Example 2. The polyethersulfone oligomer thus recovered had a degree of polymerization of 11.42 and a Tg of 154.9° C.

EXAMPLE 5

As a control experiment a polymerization was conducted in the absence of the second polymer (polycarbonate) and by use of excess amount of bisphenol A salt relative to bis(4-chlorophenyl)sulfone with intent of obtaining polyethersulfone oligomer. Thus anhydrous disodium salt was prepared from 13.018 g (57.03 mmol; 10% molar excess) of bisphenol A in 75 ml of anisole. Polymerization was performed employing 14.738 g (51.32 mmol) of bis(4-chlorophenyl)sulfone and 794 mg (2.28 mmol) of hexa-n-propylguanidinium chloride. The polymerization mixture was heated under reflux for 0.5 hours and the product was isolated. The polyethersulfone had a weight average molecular weight of 41,700 despite 10% excess of bisphenol A salt being employed. The theoretical weight average molecular weight, if the reaction were run in a homogeneous system, was expected to be about 8,200 (degree of polymerization about 10).

EXAMPLE 6

The procedure of Example 1 was repeated, employing 4.555 g (113.87 mmol) of 50.36% aqueous sodium hydroxide, 12.997 g (56.93 mmol) of bisphenol A, 16.349 g (56.93 mmol) of bis(4-chlorophenyl)sulfone, 792 mg (2.28 mmol) of hexa-n-propylguanidinium chloride along with 90 ml of anisole, and substituting 1.520 g (6.33 mmol polymer repeat unit) of a polyarylate (Mw=105,000) derived from resorcinol and 1:1 iso/terephthalate for the polycarbonate. A copolyesterethersulfone was obtained having a single Tg of 172° C. and weight average molecular weight of 25,600.

EXAMPLE 7

The procedure of Example 1 was repeated, substituting 1,3-bis[N-(4-chlorophthalimido)]benzene for the bis(4-chlorophenyl)sulfone on an equimolar basis to the polycarbonate (i.e. 15.52 mmol). A copolyetherimidecarbonate was obtained with a single Tg of 204° C. and weight average molecular weight of 40,000.

EXAMPLE 8

The procedure of Example 1 is repeated, substituting bis(4-fluorophenyl)ketone on an equimolar basis for the bis(4-chlorophenyl)sulfone. A copolyetherketonecarbonate is obtained.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A method for preparing a copolymer of a first polymer which is a polyethersulfone and a second condensation polymer which is a polyarylate, which comprises contacting, under reactive conditions, at least one salt of a dihydroxyaromatic compound with at least one substituted aromatic compound of the formula $$Z(A^1-X^1)_2, \tag{I}$$

wherein Z is an activating radical, $A^1$ is an aromatic radical and $X^1$ is fluoro, chloro, bromo or nitro, in the presence of said second polymer.

2. The method according to claim 1 wherein the second polymer is present in the amount of about 2–50 mole percent of structural units therein based on substituted aromatic compound.

3. The method according to claim 2 wherein the molar ratio of said salt to said substituted aromatic compound is 0.98–1.02:1.

4. The method according to claim 2 wherein the contact temperature is in the range of about 125–300° C.

5. The method according to claim 2 wherein the dihydroxyaromatic compound salt is a sodium or potassium salt.

6. The method according to claim 2 wherein a solvent is present.

7. The method according to claim 6 wherein the solvent is a dipolar aprotic solvent.

8. The method according to claim 6 wherein the solvent is a water-immiscible aromatic compound.

9. The method according to claim 8 wherein the solvent is o-dichlorobenzene or anisole or a mixture thereof.

10. The method according to claim 8 wherein a phase transfer catalyst is also present.

11. The method according to claim 10 wherein the phase transfer catalyst is a hexaalkylguanidinium halide.

12. The method according to claim 10 wherein the contact temperature is in the range of about 125–250° C.

13. The method according to claim 3 wherein the molar ratio of said salt to said substituted aromatic compound is 1:1.

14. The method according to claim 1 wherein the polyarylate is a bisphenol A, resorcinol or hydroquinone iso/terephthalate.

15. The method according to claim 2 wherein the substituted aromatic compound is a bis(haloaryl)sulfone.

16. The method according to claim 15 wherein the bis (haloaryl)sulfone is bis(4-chlorophenyl)sulfone.

17. A method for preparing a copolymer of a polyethersulfone and a polyarylate which comprises contacting, under reactive conditions, at least one alkali metal salt of bisphenol A with bis(4-chlorophenyl)sulfone in solution in o-dichlorobenzene or anisole, in the presence of a polyarylate and about 1–10 mole percent, based on said bis(4-chlorophenyl)sulfone, of a hexaalkylguanidinium halide as phase transfer catalyst and at a temperature in the range of about 125–250° C.

* * * * *